United States Patent
Shin et al.

(10) Patent No.: US 10,061,695 B2
(45) Date of Patent: Aug. 28, 2018

(54) MEMORY SYSTEM AND OPERATING METHOD THEREOF

(71) Applicant: SK hynix Inc., Gyeonggi-do (KR)

(72) Inventors: Beom Ju Shin, Gyeonggi-do (KR); Dae Hong Kim, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 65 days.

(21) Appl. No.: 15/237,391

(22) Filed: Aug. 15, 2016

(65) Prior Publication Data

US 2017/0270040 A1 Sep. 21, 2017

(30) Foreign Application Priority Data

Mar. 17, 2016 (KR) .......................... 10-2016-0032048

(51) Int. Cl.
| | |
|---|---|
| *G06F 12/00* | (2006.01) |
| *G06F 12/02* | (2006.01) |
| *G06F 12/10* | (2016.01) |
| *G06F 12/1009* | (2016.01) |

(52) U.S. Cl.
CPC ...... *G06F 12/0246* (2013.01); *G06F 12/0292* (2013.01); *G06F 12/10* (2013.01); *G06F 12/1009* (2013.01); *G06F 2212/7201* (2013.01)

(58) Field of Classification Search
CPC .. G06F 12/0246; G06F 12/0292; G06F 12/10; G06F 12/1009; G06F 2212/7201
See application file for complete search history.

(56) References Cited

U.S. PATENT DOCUMENTS 8,621,137 B2 * 12/2013 Olbrich ............... G06F 13/1657
710/317
2011/0072199 A1 * 3/2011 Reiter ..................... G06F 13/14
711/103

FOREIGN PATENT DOCUMENTS

| KR | 1020090095909 | 9/2009 |
| KR | 1020100037789 | 4/2010 |
| KR | 1020130019999 | 2/2013 |

* cited by examiner

*Primary Examiner* — Shawn X Gu
(74) *Attorney, Agent, or Firm* — IP & T Group LLP

(57) ABSTRACT

Provided herein are a memory system and an operating method thereof. A method of operating a controller for controlling a memory block including a plurality of pages includes determining whether the memory block is in an open state or a closed state, if the memory block is in the open state, reading merged metadata included in the plurality of pages, and rebuilding logical to physical (L2P) mapping data of a plurality of logical pages included in each of the plurality of pages based on the merged metadata.

20 Claims, 14 Drawing Sheets

| FIRST PAGE (WL1) | LSB | FIRST DATA | FIRST META DATA |
|---|---|---|---|
| | CSB | SECOND DATA | SECOND META DATA |
| | MSB | THIRD DATA | THIRD META DATA |

| SECOND PAGE (WL2) | LSB | FOURTH DATA | FOURTH META DATA |
|---|---|---|---|
| | CSB | FIFTH DATA | FIFTH META DATA |
| | MSB | SIXTH DATA | SIXTH META DATA |

| THIRD PAGE (WL3) | LSB | SEVENTH DATA | SEVENTH META DATA |
|---|---|---|---|
| | CSB | EIGHTH DATA | EIGHTH META DATA |
| | MSB | NINTH DATA | NINTH META DATA |

| META PAGE (WL4) | LSB | FIRST TO THIRD META DATA |
|---|---|---|
| | CSB | FOURTH TO SIXTH META DATA |
| | MSB | SEVENTH TO NINTH META DATA |

| FIRST PAGE (WL1) | LSB | FIRST DATA | FIRST META DATA |
| --- | --- | --- | --- |
| | CSB | SECOND DATA | SECOND META DATA |
| | MSB | THIRD DATA | THIRD META DATA |

| SECOND PAGE (WL2) | LSB | FOURTH DATA | FOURTH META DATA |
| --- | --- | --- | --- |
| | CSB | FIFTH DATA | FIFTH META DATA |
| | MSB | SIXTH DATA | SIXTH META DATA |

| THIRD PAGE (WL3) | LSB | SEVENTH DATA | SEVENTH META DATA |
| --- | --- | --- | --- |
| | CSB | EIGHTH DATA | EIGHTH META DATA |
| | MSB | | |

| META PAGE (WL4) | LSB | | |
| --- | --- | --- | --- |
| | CSB | | |
| | MSB | | |

FIG. 7

| NTH PAGE (WLn) | LSB | FIRST DATA | FIRST TO THIRD META DATA |
|---|---|---|---|
| | CSB | SECOND DATA | FIRST TO THIRD META DATA |
| | MSB | THIRD DATA | FIRST TO THIRD META DATA |

FIG. 8

| (N+1)TH PAGE (WLn+1) | LSB | FOURTH DATA | FOURTH META DATA |
|---|---|---|---|
| | CSB | FIFTH DATA | FOURTH AND FIFTH META DATA |
| | MSB | SIXTH DATA | FOURTH TO SIXTH META DATA |

| | LSB | FIRST DATA | FIRST META DATA |
|---|---|---|---|
| FIRST PAGE (WL1) | CSB | SECOND DATA | FIRST AND SECOND META DATA |
| | MSB | THIRD DATA | FIRST TO THIRD META DATA |
| | LSB | FOURTH DATA | FOURTH META DATA |
| SECOND PAGE (WL2) | CSB | FIFTH DATA | FOURTH AND FIFTH META DATA |
| | MSB | SIXTH DATA | FOURTH TO SIXTH META DATA |
| | LSB | SEVENTH DATA | SEVENTH META DATA |
| THIRD PAGE (WL3) | CSB | EIGHTH DATA | SEVENTH AND EIGHTH META DATA |
| | MSB | NINTH DATA | SEVENTH TO NINTH META DATA |
| | LSB | FIRST TO THIRD META DATA | |
| META PAGE (WL4) | CSB | FOURTH TO SIXTH META DATA | |
| | MSB | SEVENTH TO NINTH META DATA | |

SB4

| | LSB | FIRST DATA | FIRST TO THIRD META DATA |
|---|---|---|---|
| FIRST PAGE (WL1) | CSB | SECOND DATA | FIRST TO THIRD META DATA |
| | MSB | THIRD DATA | FIRST TO THIRD META DATA |
| | LSB | FOURTH DATA | FOURTH TO SIXTH META DATA |
| SECOND PAGE (WL2) | CSB | FIFTH DATA | FOURTH TO SIXTH META DATA |
| | MSB | SIXTH DATA | FOURTH TO SIXTH META DATA |
| | LSB | SEVENTH DATA | SEVENTH TO NINTH META DATA |
| THIRD PAGE (WL3) | CSB | EIGHTH DATA | SEVENTH TO NINTH META DATA |
| | MSB | NINTH DATA | SEVENTH TO NINTH META DATA |
| | LSB | FIRST TO THIRD META DATA | |
| META PAGE (WL4) | CSB | FOURTH TO SIXTH META DATA | |
| | MSB | SEVENTH TO NINTH META DATA | |

MEMORY SYSTEM AND OPERATING METHOD THEREOF

CROSS-REFERENCE TO RELATED APPLICATION

The present application claims priority under 35 U.S.C. § 119 to Korean patent application No. 10-2016-0032048, filed on Mar. 17, 2016, which is incorporated herein by reference in its entirety.

BACKGROUND

1. Field

An aspect of the present invention relates to an electronic device and, more particularly, to a memory system and an operating method thereof.

2. Description of the Related Art

A memory system is widely used as a data storage device of digital devices, such as, for example, a computer, a digital camera, an MP3 player, and a smart phone. The memory system may include a semiconductor memory device for storing data and a controller for controlling the semiconductor memory device. The digital devices operate as hosts, while the controller transmits commands and data between the hosts and the semiconductor memory device.

A semiconductor memory device is an integrated circuit implemented on a chip of semiconductor material, such as, for example, silicon (SI), germanium (Ge), gallium arsenide (GaAs), or indium phosphide (InP). Semiconductor memory devices are generally classified into volatile and nonvolatile memory devices.

A volatile memory device loses stored data when a power supply to the device is turned off. Examples of a volatile memory include a static random access memory (SRAM), a dynamic RAM (DRAM), a synchronous DRAM (SDRAM), and the like. A nonvolatile memory device retains stored data even when a power supply to the device is turned off. Examples of a nonvolatile memory include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. Flash memory devices are used widely and are generally classified into NOR or NAND flash memory devices.

SUMMARY

Embodiments of the present invention provide a memory system having improved operation speed and an operating method thereof.

According to an aspect of the present disclosure, there is provided a method of operating a controller for controlling a memory block including a plurality of pages, the method including: determining whether the memory block is in an open state or a closed state; if the memory block is in the open state, reading merged metadata included in the plurality of pages; and rebuilding logical to physical (L2P) mapping data of a plurality of logical pages included in each of the plurality of pages based on the merged metadata.

According to an aspect of the present disclosure, there is provided a controller for controlling a memory block including a plurality of pages, the controller including: a processor configured to determine whether the memory block is in an open state or a closed state, and, if the memory block is in the open state, read merged metadata included in the plurality of pages; and a memory controller configured to rebuild logical to physical (L2P) mapping data of a plurality of logical pages included in each of the plurality of pages based on the merged metadata.

According to an aspect of the present disclosure, there is provided a memory system including: a memory device including a memory block including a plurality of pages, suitable for storing merged metadata by adding metadata of a plurality of logical page data to be stored in a selected page among the plurality of pages in metadata areas of a plurality of logical pages included in the selected page; and a controller suitable for rebuilding logical to physical (L2P) mapping data based on the merged metadata.

BRIEF DESCRIPTION OF THE DRAWINGS

Various embodiments of the present invention will now be described in reference to the accompanying drawings wherein:

FIG. 5 is a diagram illustrating an example of a closed super-block.

FIG. 6 is a diagram illustrating an example of an open super-block.

FIG. 7 is a diagram illustrating a method of merging and storing metadata, according to an embodiment of the present invention.

FIG. 8 is a diagram illustrating a method of merging and storing metadata, according to another embodiment of the present invention.

FIG. 9 is a diagram illustrating closed super-blocks including merged metadata, according to an embodiment of the present invention.

DETAILED DESCRIPTION

Figure 1:
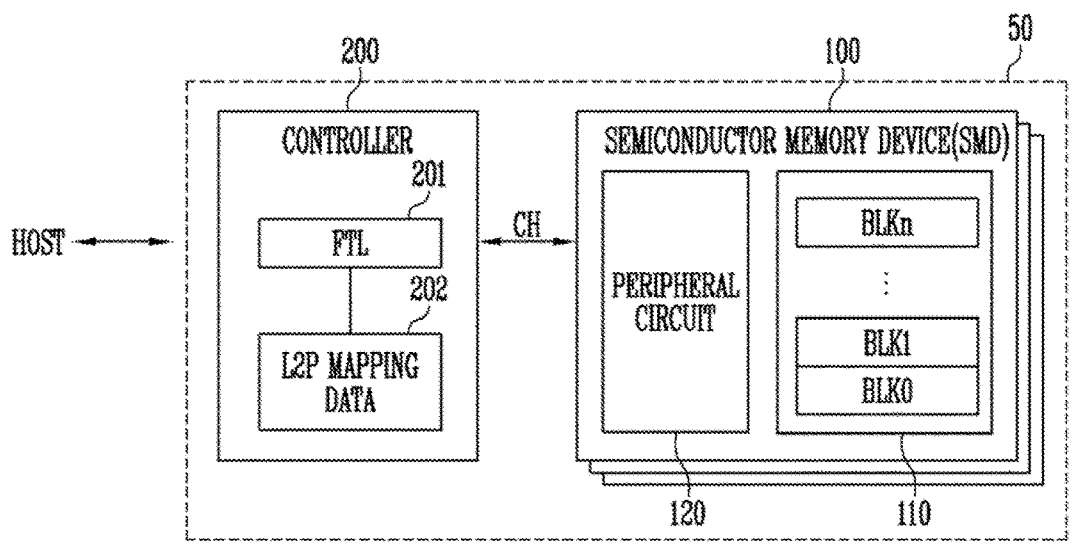
FIG. 1 is a diagram illustrating a memory system, according to an embodiment of the present invention.

The specific structural or functional description disclosed herein is merely illustrative for the purpose of describing embodiments according to the present invention. However, we note that the embodiments of the present invention presented herein may also be implemented in various forms, and cannot be construed as being limited to the descriptions set forth herein.

Embodiments of the present invention may be variously modified to various shapes. Thus, although specific embodiments are illustrated in the drawings and described herein in detail, the present invention should not be construed as being limited to the described embodiments, and may include all changes, equivalents, or substitutes that do not depart from the spirit and or scope of the present invention as defined in the appended claims.

It should also be noted that terms such as, for example, "first" and "second" may be used to describe various elements, however, such elements must not be understood as being limited to the above terms. The above terms are used only to distinguish one element from another element. For example, a first element may be referred to as a second element without departing from the scope of the present invention, and likewise a second element may be referred to as a first element.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between elements such as, for example, "between," "immediately between," "adjacent to" and "directly adjacent to" may be construed similarly.

The terms used in the present application are merely used to describe particular embodiments, and are not intended to limit the present invention.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise for example indicated.

Hereinafter, exemplary embodiments of the present invention will be described in detail with reference to the accompanying drawings.

Referring now to FIG. 1 a memory system 50 is provided, according to an embodiment of the present invention.

According to the embodiment of FIG. 1, the memory system 50 may include a semiconductor memory devices (SMD) 100 and a controller 200 for controlling the SMD 100. The memory system 50 may include a plurality of semiconductor memory devices (SMD) 100 and a plurality of controllers 200 each controller controlling a respective SMD 100.

The memory system 50 may store data received from a host (HOST) in the SMD 100 in response to a request received from the host. The memory system 50 may read data requested by the host from the SMD 100 and transmit the read data to the host. The host may communicate with controller 200 for storing data in the SMD 100 or for reading data from the SMD 100.

The SMD 100 may include a memory cell array 110. The memory cell array may include a plurality of nonvolatile memory cells for storing data. The SMD 100 may also include a peripheral circuit 120 for driving the memory cell array 110.

The memory cell array 110 may include a plurality of memory blocks BLK0 to BLKn. A structure of a memory block will be described in detail with reference to FIG. 2, according to an embodiment of the present invention.

The SMD 100 is configured to receive a command, an address, and data from the controller 200 through a channel CH operatively coupling the SMD 100 with the controller 200. The SMD 100 is configured to access an area in the memory cell array 110, selected based on the address received from the controller 200. For example, the SMD 100 may perform an operation corresponding to the command received to the area selected corresponding to the received address. For example, the SMD 100 may perform at least one of a program, read, and erase operations. In a program operation, the SMD 100 may program data received from the controller 200 and or from the host in the selected area of the memory array 110 corresponding to the received address. In a read operation, the SMD 100 may read the data from the selected area corresponding to the received address. In an erase operation, the SMD 100 may erase the data stored in the selected area corresponding to the received address.

The SMD 100 may be a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

In an embodiment, the SMD 100 is a flash memory device in which a charge storage layer is formed by a conductive floating gate (FG). In another embodiment, the SMD 100 is a charge trap flash (CTF) memory in which a charge storage layer is formed of an Insulation film.

The SMD 100 may be implemented in a two dimensional array structure. The SMD 100 may be implemented in a three-dimensional array structure.

In an embodiment, in data exchange between the SMD 100 and the host, the controller 200 may manage the SMD 100 using a virtual file system, such as, for example, a flash translation layer (FTL) 201, for providing compatibility between the host and an existing file system. Although, hereinafter the invention is described using the FTL 201 of FIG. 1, we note that any suitable virtual file system 201 may also be used.

The controller 200 controls the general operations of the SMD 100. For example, the controller 200 may access the SMD 100 in response to a request received from the host. The controller 200 may command the SMD 100 in response to a request from the host. In an embodiment, the controller 200 may control the SMD 100 for performing a program operation, a read operation, an erase operation, or the like. In a program operation, the controller 200 may provide the SMD 100 with a program command, an address, and data through the channel CH. In a read operation, the controller 200 may provide the SMD 100 with a read command and an address through the channel CH. In an erase operation, the controller 200 may provide the SMD 100 with an erase command and an address through the channel CH. Channel CH may be one or more channels as may be needed.

In an embodiment, the FTL 201 may translate a logical block address received from the host into a physical block address indicating a position of a specific area in the memory cell array 110 of the SMD 100 by using a mapping technique. For example, the FTL 201 may generate logical to physical (L2P) mapping data 202 obtained by mapping the logical block address to the physical block address.

The logical block address is an address recognized by the host. The host may, for example, write or read data by specifying the logical block address instead of the physical block address as an address of an area in which the data is actually stored in the SMD 100. The physical block address is an address of an area in which actual data is stored in the SMD 100. The controller 200 receives a logical block address from the host, and may store data in a physical block address corresponding to the logical block address received based on the L2P mapping data 202, or may read data stored in the physical block address.

Figure 2:
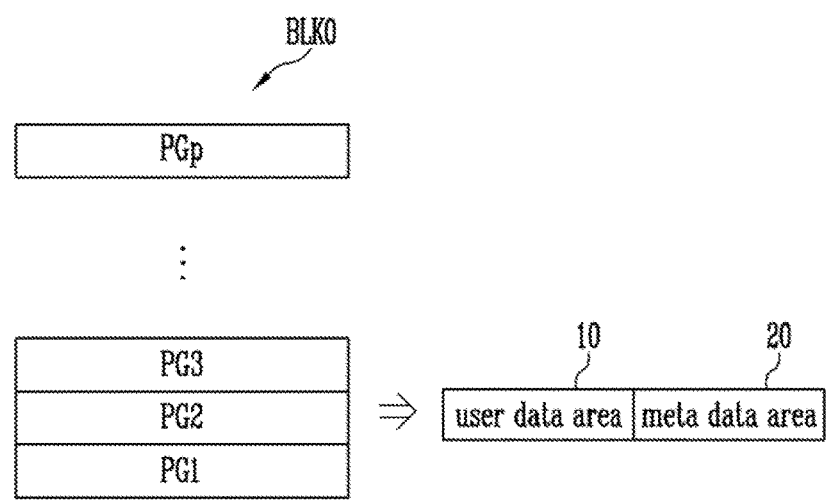
FIG. 2 is a diagram illustrating a memory block of the memory system of FIG. 1.

Referring now to FIG. 2 an example of a memory block among the plurality of memory blocks of the memory cell array 110 in FIG. 1 is provided.

In FIG. 2, for convenience of illustration, only elements included in one memory block BLK0 among the plurality of memory blocks BLK0 to BLKn are shown. Elements included in each of the other memory blocks BLK1 to BLKn are omitted. However, we note that each of the other memory blocks BLK1 to BLKn may have the same structure as the memory block BLK0 of FIG. 2.

According to the embodiment of FIG. 2, the memory block BLK0 may include a plurality of pages PG1 to PGp. Although not shown, it will be understood that each page includes a plurality of memory cells (not shown) coupled to a word line.

Each page may be divided into a user data area 10 in which user data is stored and a metadata area 20 in which metadata is stored.

Although, FIG. 2 illustrates that each page allocates about 50 percent of the memory cells to the user data area 10 and the other 50 percent to the metadata area 20, we note that the relative size of the user data area 10 with respect to the metadata area is not limited by FIG. 2. User data, for example, data that the host requests to be stored in the SMD 100 may be stored in the user data area 10. Metadata, for example, structural metadata required in operations of the SMD 100 may be stored in the metadata area 20.

Each of the memory cells of the SMD 100 may be configured as a single level cell (SLC) which stores one bit of data, a multi-level cell (MLC) which stores two bits of data, or a triple level cell (TLC) which stores three bits of data.

In the case of a SLC which stores one bit of data in one memory cell, one logical page data may be stored in one page. In the case of the MLC which stores two bits of data in one memory cell, two logical page data may be stored in one page. In an embodiment, the logical page data may be least significant bit (LSB) page data and most significant bit (MSB) page data, respectively. In the case of the TLC which stores three bits of data in one memory cell, three logical page data may be stored in one page. In an embodiment, the logical page data may be an LSB page data, a center significant bit (CSB) page data, and an MSB page data.

Metadata may be generated for every logical page, and may be stored in the metadata area 20. For example, the metadata may include L2P mapping data that is information on logical and physical block addresses of corresponding user data. In an embodiment, the metadata may further include logical page information representing which logical page data the corresponding user data is.

Figure 3:
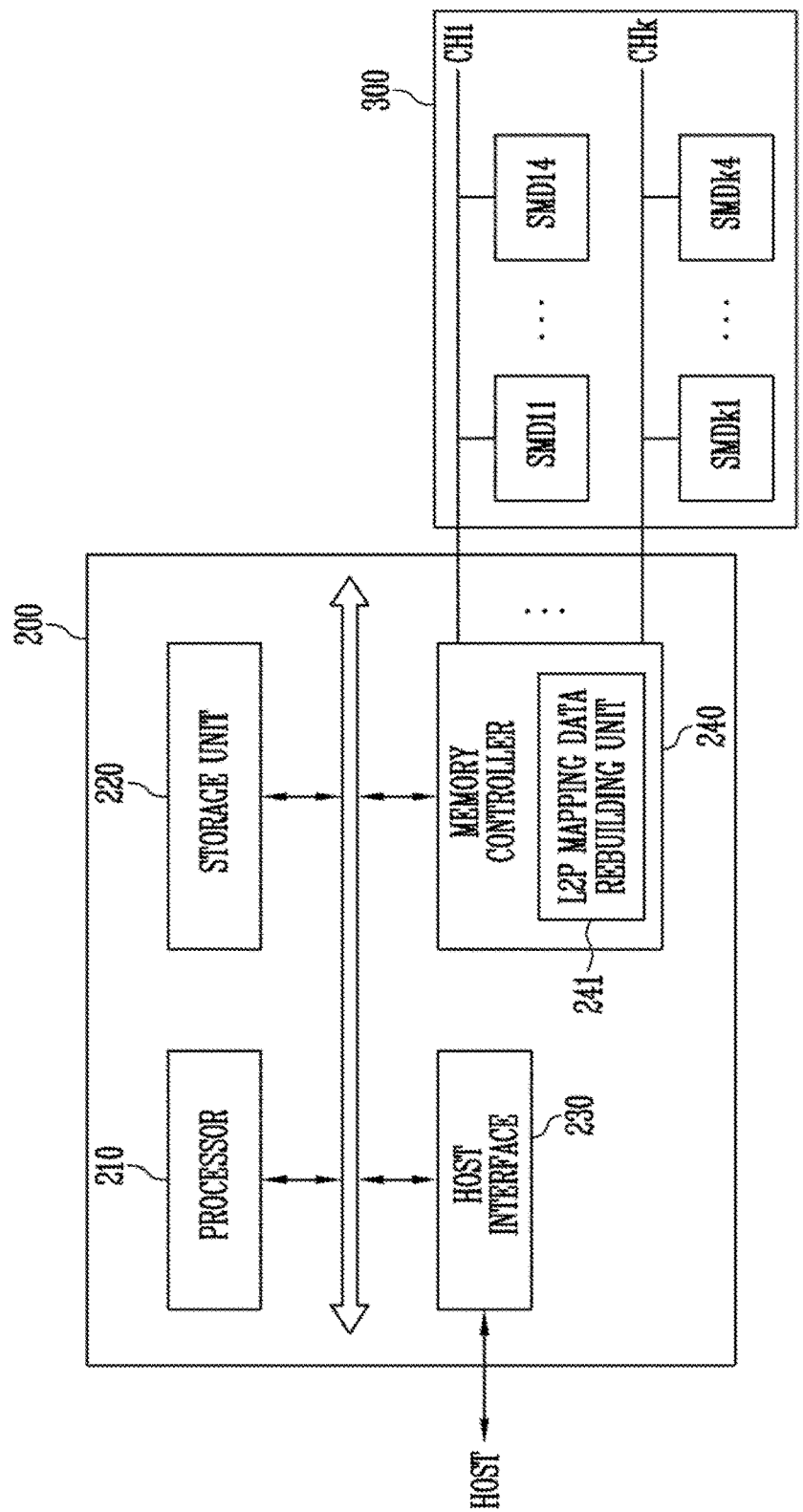
FIG. 3 is a block diagram illustrating a controller, according to an embodiment of the present invention.

FIG. 3 is a block diagram illustrating a controller 200 according to an embodiment of the present invention.

Referring to FIG. 3, the controller 200 controls a plurality of semiconductor memory devices (SMDs) 300, e.g., SMD11 to SMDk4. The plurality of SMDs may be arranged in rows, e.g., SMD11 to SMD 14 and in columns, e.g., SMD11 to SMDk1. When the controller 200 commands a read operation, a selected SMD performs the read operation. When the controller 200 commands a program operation, a selected SMD performs the program operation. When the controller 200 commands an erase operation, a selected SMD performs the erase operation.

The controller 200 may include a processor 210, a storage unit 220, a host interface 230, and a memory controller 240.

The processor 210 may perform the general operations of the controller 200. The processor 210 may include firmware for controlling the plurality of SMDs SMD11 to SMDk4. The firmware may include a flash translation layer (FTL) described with reference to FIG. 1. Alternatively, the firmware may perform the functions of the FTL.

If a request is received from a host through the host interface 230, the processor 210 may generate a physical block address corresponding to the request.

The processor 210 may translate a logical block address included in the request into a physical block address. When the request from the host is a program request, program data is additionally received from the host. The processor 210 may store, in the storage unit 220, a physical block address, program data, and a program command corresponding to the program request. The program command, the physical block address, and the program data, which are stored in the storage unit 220, may be transmitted, by the memory controller 240, to a selected SMD among the plurality of SMDs SMD11 to SMDk4 specified by the physical block address.

When the request from the host is a read request, the processor 210 may store, in the storage unit 220, a physical block address and a read command corresponding to the read request. The read command and the physical block address, which are stored in the storage unit 220, may be transmitted, by the memory controller 240, to a selected SMD among the plurality of SMDs SMD11 to SMDk4 specified by the physical block address.

When the request from the host is an erase request, the processor 210 may store, in the storage unit 220, a physical block address and an erase command corresponding to the erase request. The erase command and the physical block address, which are stored in the storage unit 220, may be transmitted, by the memory controller 240, to a selected SMD among the plurality of SMDs SMD11 to SMDk4 specified by the physical block address.

In an embodiment, the processor 210 may generate, by itself, a command, a physical block address, and data without any request from the host, and transmit the self-generated command, physical block address, and data to a selected SMD among the plurality of SMDs SMD11 to SMDk4 specified by the self-generated physical block address. For example, the processor 210 may self-generate a command, a physical block address, and data and transmit them to a selected SMD corresponding to the self-generated physical block address for performing background operations, such as, an operation for wear leveling and an operation for garbage collection.

The storage unit 220 may be used as a working memory of the processor 210. Alternatively, the storage unit 220 may be used as a buffer memory between the plurality of SMDs SMD11 to SMDk4 and the host. In an embodiment, the storage unit 220 may be used as a cache memory between the SMDs SMD11-SMD14 to SMDk1-SMDk4 and the host. The storage unit 220 may also be used as a buffer for arbitrarily storing data read from the plurality of the SMDs SMD11 to SMDk4. In an exemplary embodiment, the storage unit 220 may include at least one of various randomly accessible memories, such as, for example, a static RAM (SRAM), a dynamic RAM (DRAM), a synchronous DRAM (SDRAM), a phase-change RAM (PRAM), a magnetic RAM (MRAM), a resistive RAM (RRAM), and a ferroelectric RAM (FRAM).

In an embodiment, the storage unit 220 may store L2P mapping data described with reference to FIG. 1. The processor 210 may translate a logical block address into a physical block address by using the L2P mapping data stored in the storage unit 220. The processor 210 may update the L2P mapping data stored in the storage unit 220.

The host interface 230 may include a protocol for performing communication between the host and the controller 200. In an embodiment, the controller 200 is configured to communicate with the host through at least one of various interface protocols such as, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, and a private protocol.

The memory controller 240 operates under the supervisory control of the processor 210. The memory controller 240 is configured to control the plurality of the SMDs SMD11 to SMDk4 through a plurality of channels, e.g., first to kth channels CH1 to CHk. The memory controller 240 may transmit a command and a physical block address, which are stored in the storage unit 220, to a selected SMD among the plurality of SMDs SMD11 to SMDk4, in response to control of the processor 210.

In a program operation, the plurality of SMDs SMD11 to SMDk4 may store user data in a user data area and store metadata corresponding to the user data in a metadata area. In an embodiment, in the case of a memory cell in which a plurality of logical page data may be stored in one page, metadata may be stored for each logical page.

According to an embodiment of the present invention, the metadata corresponding to the logical page data may be merged metadata.

In an embodiment, the controller 200 may sequentially program logical page data. For example, LSB page data, CSB page data, or MSB page data may be sequentially stored in the SMD through a plurality of program operations.

In this case, merged metadata may be obtained by cumulatively adding metadata of logical page data belonging to the same page.

In an embodiment, the controller 200 may store a plurality of logical page data through a one-shot program operation. For example, LSB page data, CSB page data, and MSB page data may be stored through a one-shot program operation. In this case, the merged metadata may be obtained by merging metadata of a plurality of logical page data belonging to the same page. For example, the metadata for each of the LSB page data, the CSB page data, and the MSB page data may be obtained by merging metadata of the LSB page data, the CSB page data, and the MSB page data.

If the power supply to the device is suddenly interrupted (hereinafter, referred to as sudden power loss), L2P mapping data stored in a volatile memory may be deleted. Therefore, in such a scenario, the controller 200 may rebuild the L2P mapping data for performing a normal operation when power is re-established.

An L2P mapping data rebuilding unit 241 included in the memory controller 240 may rebuild (or recover) the L2P mapping data by reading metadata stored in the plurality SMDs SMD11 to SMDk4.

According to an embodiment of the present invention, the L2P mapping data rebuilding unit 241 may rebuild L2P mapping data by reading merged metadata. In this case, the L2P mapping data rebuilding unit 241 does not read each of the metadata corresponding to all the logical page data stored in the same page but only reads the merged metadata of at least one logical page data among a plurality of logical page data stored in the same page, thereby improving the speed at which the L2P mapping data is rebuilt.

In an embodiment, although not shown in this figure, the memory controller 240 may further include a memory interface for communicating with the plurality of SMDs SMD11 to SMDk4. The memory interface may include a protocol for communicating with the plurality of SMDs SMD11 to SMDk4. For example, the memory interface may include at least one flash interface, such as, a NAND interface and a NOR interface.

Figure 4:
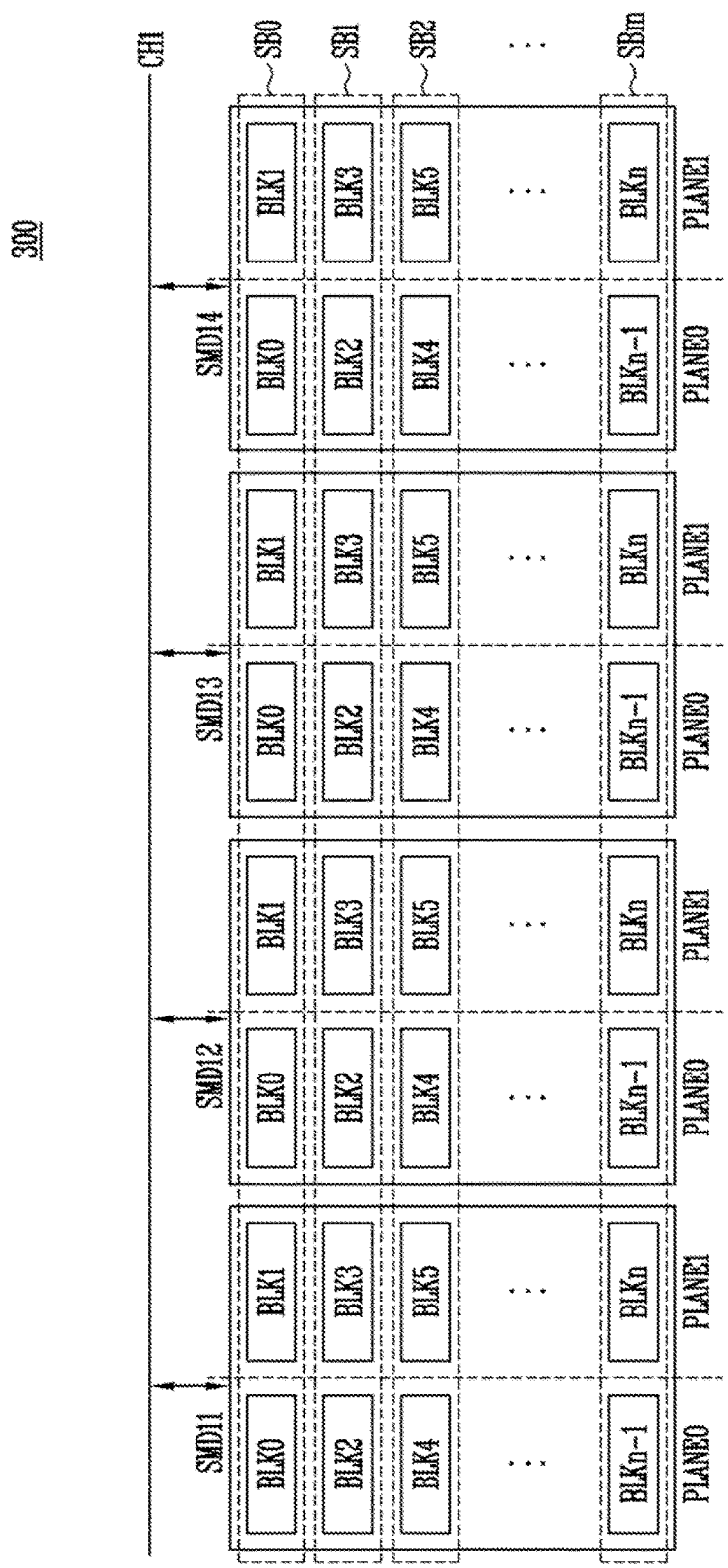
FIG. 4 is a diagram illustrating a plurality of semiconductor memory devices coupled to the controller of FIG. 3, according to an embodiment of the present invention.

FIG. 4 is a diagram illustrating a plurality of semiconductor memory devices 300 coupled to the controller 200 of FIG. 3 via a first channel CH1, according to an embodiment of the present invention.

Referring to FIG. 4, a plurality of SMDs SMD11 to SMD14 may communicate with the controller 200 through the first channel CH1. In FIG. 4, for convenience of illustration, a case where four SMDs are coupled to one channel is shown. However, the number of SMDs coupled to one channel is not limited to four as shown in FIG. 4.

Each of the plurality of SMDs SMD11 to SMD14 may include a plurality of planes, for example two planes PLANE0 and PLANE1, as illustrated in the embodiment of FIG. 4. Each of the planes PLANE0 and PLANE1 may include a plurality of memory blocks. For example, a zeroth plane PLANE0 may include even memory blocks including zeroth to (n−1)th memory blocks BLK0, BLK2, BLK4 and BLKn−1, and a first plane PLANE1 may include odd memory blocks including first to nth memory blocks BLK1, BLK3, BLK5 and BLKn, wherein n is a natural number. The plane may be a unit where basic operations of the SMD are performed. For example, a program operation, a read operation, or an erase operation may be performed in units of planes. The number of planes included in each SMD is not limited to only two as shown in the embodiment of FIG. 4. For example, in an embodiment, only one single plane may be included in each SMD. In another embodiment three planes may be included in each SMD. In yet other embodiments, four or more planes may be included in each SMD.

In FIG. 4, for convenience of illustration, only elements coupled to the first channel CH1 among the first to kth channels CH1 to CHk of FIG. 3 are shown, while elements coupled to the other channels CH2 to CHk are omitted. Each of the other channels CH2 to CHk may be coupled to a same structure as the structure coupled to channel CH1 of FIG. 4.

Each of the plurality of SMDs SMD11 to SMD14 coupled to the first channel CH1 includes a plurality of planes, and each of the plurality of planes may include a plurality of memory blocks. The memory blocks included in each of the plurality of SMDs SMD11 to SMD14 which are coupled to the first channel CH1 may be divided into a plurality of super-blocks SB0 to SBm. For example, each of the super-blocks SB0 to SBm includes a plurality of memory blocks included in the plurality of SMDs SMD11 to SMD14 coupled to the same channel. For example, as illustrated in FIG. 4, each of the super-blocks SB0 to SBM includes at least one block from each plane of each SMD. Since one memory block includes a plurality of pages as described with reference to FIG. 2, it follows that each of the super-blocks SB0 to SBm also includes a plurality of pages.

The super-blocks SB0 to SBm may be units for storing different types of data. For example, firmware may be stored in a zeroth super-block SB0. In an embodiment, each super-block includes one block from each plane of each SMD coupled to the same channel, i.e., the number of memory blocks included in each super-block is a value obtained by multiplying the number of SMDs coupled to the same channel and the number of planes included in each of the SMDs.

In an embodiment, the super-blocks SB0 to SBm may be units for performing the same operation as garbage collection. According to an embodiment of the present invention, the super-blocks SB0 to SBm may be units for performing an operation of rebuilding L2P mapping data due to the occurrence of an SPL. For example, when L2P mapping data is rebuilt, the L2P mapping data may be rebuilt for each super-block.

FIG. 5 is a diagram illustrating an example of a closed super-block.

For convenience of illustration, it is assumed that a zeroth super-block SB0 of FIG. 5 includes four pages. However, we note, that the number of pages included in a super-block is not limited to four as illustrated in the embodiment of FIG. 5. Hereinafter, it is assumed that each of the memory cells included in each super-block is a TLC which stores three bits of data. However, we note that other embodiments of the present invention may employ MLC or QLC memory cells as described above.

Referring to FIG. 5, the zeroth super-block SB0 may include four pages. The four pages may include first to third pages and a meta page. The first to third pages may be pages including a plurality of memory cells coupled to first to third word lines WL1 to WL3, respectively.

The zeroth super-block SB0 of FIG. 5 is in a closed state in which all pages are written with data, hence, no other data can be written without first erasing some of the already stored data.

Because TLC memory cells are employed, three logical page data may be stored in each page coupled to a single word line. For example, one page may include three logical pages, for example, an LSB page, a CSB page, and an MSB page. First to third data may be stored in the LSB, CSB, and MSB pages, respectively. Hence, in the illustrated example of FIG. 5, the first data may be LSB page data, the second data may be CSB page data, and the third data may be MSB data. The first to third data may be sequentially stored through a plurality of program operations. Alternatively, the first to third data may be stored through a one-shot program operation.

When the first to third data are stored, the first to third metadata as metadata for logical page data may be stored in metadata areas of the logical pages, respectively. For example, first metadata may be stored in the meta page area of the logical page, in which the first data is stored, second metadata may be stored in the meta page area of the logical page, in which the second data is stored, and third metadata may be stored in the meta page area of the logical page, in which the third data is stored.

In the memory system which is managed using super-blocks, if all page data included in a super-block are stored, all metadata stored in the corresponding super-block may be stored in one page. Here, the one page in which all metadata stored in the super-block are stored may be a meta page.

If the super-block is in the closed state as shown in FIG. 5 when an operation of rebuilding L2P mapping data due to the occurrence of an SPL is performed, the L2P mapping data may be rebuilt not by reading metadata stored in each page but by reading only meta pages.

FIG. 6 is a diagram illustrating an example of an open super-block. An open super-block has at least one page which is empty, i.e., a page which does not contain any written data.

For convenience of illustration, it is assumed that a first super-block SB1 of FIG. 6 includes four pages. The number of pages included in one super-block is not limited to four pages as illustrated in the embodiment of FIG. 6. Hereinafter, it is assumed that each of memory cells included in the super-block is a TLC which stores three bits of data. However, according to other embodiments of the present invention MLC or QLC memory cells may be employed, as described above.

Referring to the example of an open super-block of FIG. 6, the first super-block SB1 may include four pages. Each of the four pages may include first to third pages and a meta page. The first to third pages may include a plurality of memory cells coupled to first to third word lines WL1 to WL3, respectively.

In the first super-block SB1, both user data and metadata are stored in the first and second pages, but the third page may be in a state in which only seventh data as LSB page data and eighth data as CSB page data are stored. Therefore, in the first super-block SB1, data may be further stored in an MSB page of the third page WL3. In addition, data are not stored in all pages of the super-block, and hence the meta page is in a state in which any data is not written therein.

If the super-block is in an open state as shown in FIG. 6 when an operation of rebuilding L2P mapping data due to the occurrence of an SPL is performed, metadata for all logical page data stored in each page are all to be read.

Therefore, when metadata for logical page data stored in a logical page is stored only in the corresponding logical page, like in the first super-block SB1 of FIG. 6, substantially more time is required for rebuilding the L2P mapping data in the event of an SPL. This is because the L2P mapping data can be rebuilt only when metadata for all logical page data are to be read.

According to an embodiment of the present invention, the L2P mapping data can be rebuilt by merging and storing metadata for logical page data and reading the merged data.

Thus, when the super-block is in an open state (i.e., an open block) it is possible to reduce the time required to rebuild L2P mapping data.

Hereinafter, a structure in which metadata are merged and stored will be described with reference to FIGS. 7 to 11, and a method of rebuilding L2P mapping data using merged metadata will be described in detail with reference to FIGS. 12 to 15.

Referring now to FIG. 7 a method of merging and storing metadata is provided, according to an embodiment of the present invention.

According to the embodiment of FIG. 7, an nth page as at least one page included in the memory cell array represents memory cells coupled to an nth word line. In FIG. 7, it is assumed that each of memory cells is a TLC which stores three bits of data. However, the embodiment of the present invention may be applied to the MLC or QLC method as described above.

In FIG. 7, three logical page data may be stored in a page corresponding to a word line. For example, one page may include three logical pages. Here, the three logical pages may be an LSB page, a CSB page, and an MSB page. First to third data may be stored in the LSB page, the CSB page, and the MSB page, respectively. For example, the first data may be LSB data, the second data may be CSB data, and the third data may be MSB data. The nth page may store the first to third data.

In the embodiment of FIG. 7, a case where the first to third data are stored through a one-shot program operation will be described.

Referring to FIG. 7, since the first to third data are stored through the one-shot program operation, metadata (first to third metadata) for the respective first to third data may be generated simultaneously. Therefore, merged metadata obtained by adding metadata for all logical page data belonging to the same page may be stored in a metadata area of each of the logical pages in which the first to third data are stored. For example, the merged metadata may be stored in metadata areas in the LSB page, the CSB page, and the MSB page, in which the first to third data are stored, respectively. Here, the merged metadata may include L2P mapping data related to logical and physical block addresses of the first to third data.

FIG. 8 illustrates a method of merging and storing metadata, according to another embodiment of the present invention.

Referring to FIG. 8, an (n+1)th page is at least one page included in the memory cell array representing memory cells coupled to an (n+1)th word line. In FIG. 8, it is assumed that each of memory cells is a TLC which stores three bits of data. However, the present invention may be equally applied with MLC or QLC memory cells.

In FIG. 8, three logical page data may be stored in each page corresponding to a word line. For example, one page may include three logical pages. Here, the three logical pages may be an LSB page, a CSB page, and an MSB page. Fourth to sixth data may be stored in the LSB page, the CSB page, and the MSB page, respectively. Here, the fourth data may be LSB data, the fifth data may be CSB data, and the sixth data may be MSB data. The (n+1)th page may store the fourth to sixth data.

In the embodiment of FIG. 8, a case where the fourth to sixth data are sequentially stored through a plurality of program operations will be described. For example, first the fourth data and metadata may be stored in the LSB page. Then, the fifth data and metadata may be stored in the CSB page. Finally, the sixth data and metadata may be stored in the MSB page. When the fourth to sixth data are sequentially programmed, merged metadata obtained by adding previously stored metadata of logical pages may be stored in a metadata area for each data.

For example, when the fourth data is stored, the fifth and sixth metadata have not yet been generated, and therefore, only fourth metadata is stored in the metadata area of the LSB page in which the fourth data is written. When the fifth data is stored, merged metadata obtained by adding previously stored fourth and fifth metadata may be stored in the metadata area of the CSB page. After that, when the sixth data is stored, merged metadata obtained by adding the fourth to sixth metadata may be stored in the metadata area of the MSB page.

Therefore, the merged metadata stored in the metadata area of the CSB page may include L2P mapping data related to logical and physical block addresses of the fourth and fifth data. The merged metadata stored in the metadata area of the MSB page may include L2P mapping data related to logical and physical block addresses of the fourth to sixth data.

FIG. 9 is a diagram illustrating closed super-blocks including merged metadata, according to an embodiment of the present Invention.

Referring to FIG. 9, third and fourth super-blocks SB3 and SB4 will be described. For convenience of illustration, it is assumed that each of the third and fourth super-blocks SB3 and SB4 of FIG. 9 includes four pages. However, the number of pages included in one super-block is not limited to four as illustrated in FIG. 9. Hereinafter, it is assumed that each of the memory cells included in a super-block is a TLC which stores three bits of data. However, the present invention may be applied equally by employing MLC or QLC memory cells as described above.

Both the third and fourth super-blocks SB3 and SB4 may be closed super-blocks. The third super-block SB3 is a super-block including merged metadata as described with reference to FIG. 8, and the fourth super-block SB4 is a super-block including merged metadata as described with reference to FIG. 7.

In the third and fourth super-blocks SB3 and SB4, three logical page data may be stored in each page corresponding to a plurality of memory cells coupled to a word line. For example, each page may include three logical pages. Here, the three logical pages may be an LSB page, a CSB page, and an MSB page. Each of the logical pages may be divided into a user data area and a metadata area.

The third super-block SB3 may be a closed super-block according to an embodiment in which the LSB page, the CSB page, and the MSB page are sequentially written through a plurality of program operations. Hereinafter, a first page will be described as an example, and it will be understood that the other pages (second and third pages) may be configured in the same manner as the first page.

Referring to the third super-block SB3, first data of the first page may be LSB page data, second data of the first page may be CSB page data, and third data of the first page may be MSB page data. The logical page data are sequentially programmed, and therefore, the metadata of each logical page may be merged metadata obtained by adding previously stored metadata of the logical page in the same page.

For example, only first metadata is stored in the metadata area of the LSB page in the first page, but merged metadata obtained by adding previously stored first and second metadata may be stored in the metadata area of the CSB page in the first page. The second metadata is metadata of the second data that is user data to be stored in the CSB page. Merged metadata obtained by adding the previously stored first and second metadata and third metadata may be stored in the metadata area of the MSB page in the first page. The third metadata may be metadata of the third data that is user data to be stored in the MSB page. The merged metadata stored in the metadata area of each logical page may include both L2P mapping data related to logical and physical block addresses of corresponding logical page data and L2P mapping data related to logical and physical block addresses of previously stored logical page data.

In the memory system which is managed using super-blocks, if data are stored in all pages included in a super-block, all metadata stored in the corresponding super-block may be stored in one page. Here, the one page in which all of the metadata stored in the super-block are stored may be a meta page. For example, first to ninth metadata may be stored in a meta page WL4. In an embodiment, the first to ninth metadata may be divided and stored in an LSB page, a CSB page, and an MSB page, which are included in the meta page WL4. For example, the first to third metadata may be stored in the LSB page of the meta page WL4, the fourth to sixth metadata may be stored in the CSB page of the meta page WL4, and the seventh to ninth metadata may be stored in the MSB page of the meta page WL4. In various embodiments, if the number of pages included in a super-block is increased, the number of meta pages may be increased as a plurality of pages.

If the state of a super-block is a closed state, like the third super-block SB3, when L2P mapping data is rebuilt due to the occurrence of an SPL, the L2P mapping data can be rebuilt by reading the meta page WL4. If a read operation of the meta page WL4 fails, metadata of all of the logical pages should be re-read in the existing super-block SB0 described with reference to FIG. 5. However, when merged metadata is stored, like the third super-block SB3, the L2P mapping data can be rebuilt by reading merged metadata respectively stored in the metadata area of the MSB page of the first page, the metadata area of the MSB page of the second page, and the metadata area of the MSB page of the third page.

The fourth super-block SB4 is a closed super-block according to an embodiment in which the LSB page, the CSB page, and the MSB page are simultaneously written through a one-shot program operation. Hereinafter, a first page will be described as an example, and it will be understood that the other pages (second to third pages) are configured in the same manner as the first page.

Referring to the fourth super-block SB4, logical pages of each page may all be written through a one-shot program operation. For example, the LSB page, the CSB page, and the MSB page of the first page may be written through the one-shot program operation. Therefore, merged metadata obtained by adding metadata of all logical pages included in the same page may be stored in the metadata area of each logical page.

For example, merged metadata obtained by adding first to third metadata may be stored in the metadata area of each of the LSB page, the CSB page, and the MSB page in the first page. The first metadata includes L2P mapping data related to logical and physical block addresses of first data. The second metadata includes L2P mapping data related to logical and physical block addresses of second data. The third metadata includes L2P mapping data related to logical and physical block addresses of third data. Therefore, the L2P mapping data related to the logical and physical block addresses of the first to third data may be stored in the metadata areas of the LSB page, the CSB page, and the MSB page in the first page, respectively.

Since the fourth super-block SB4 is in the closed state, all metadata included in the corresponding super-block may be stored in a meta page. For example, first to ninth metadata may be stored in a meta page WL4. In an embodiment, the first to ninth metadata may be divided and stored in an LSB page, a CSB page, and an MSB page, which are included in the meta page WL4. For example, the first to third metadata may be stored in the LSB page of the meta page WL4, the fourth to sixth metadata may be stored in the CSB page of the meta page WL4, and the seventh to ninth metadata may be stored in the MSB page of the meta page WL4. In various embodiments, if the number of pages included in a super-block is increased, the number of meta pages may be increased as a plurality of pages.

If the state of a super-block is a closed state, like the fourth super-block SB4, when L2P mapping data is rebuilt due to the occurrence of an SPL, the L2P mapping data can be rebuilt by reading the meta page WL4. If a read operation of the meta page WL4 fails, metadata of all of the logical pages are again to be read in the existing super-block SB0 described with reference to FIG. 5. In the case of the fourth super-block SB4, all metadata of all logical pages in the same page are the same as merged metadata. Thus, L2P mapping page can be rebuilt by reading merged metadata stored in a meta page area of an arbitrary logical page among a plurality of logical pages included in each page.

Figure 10:
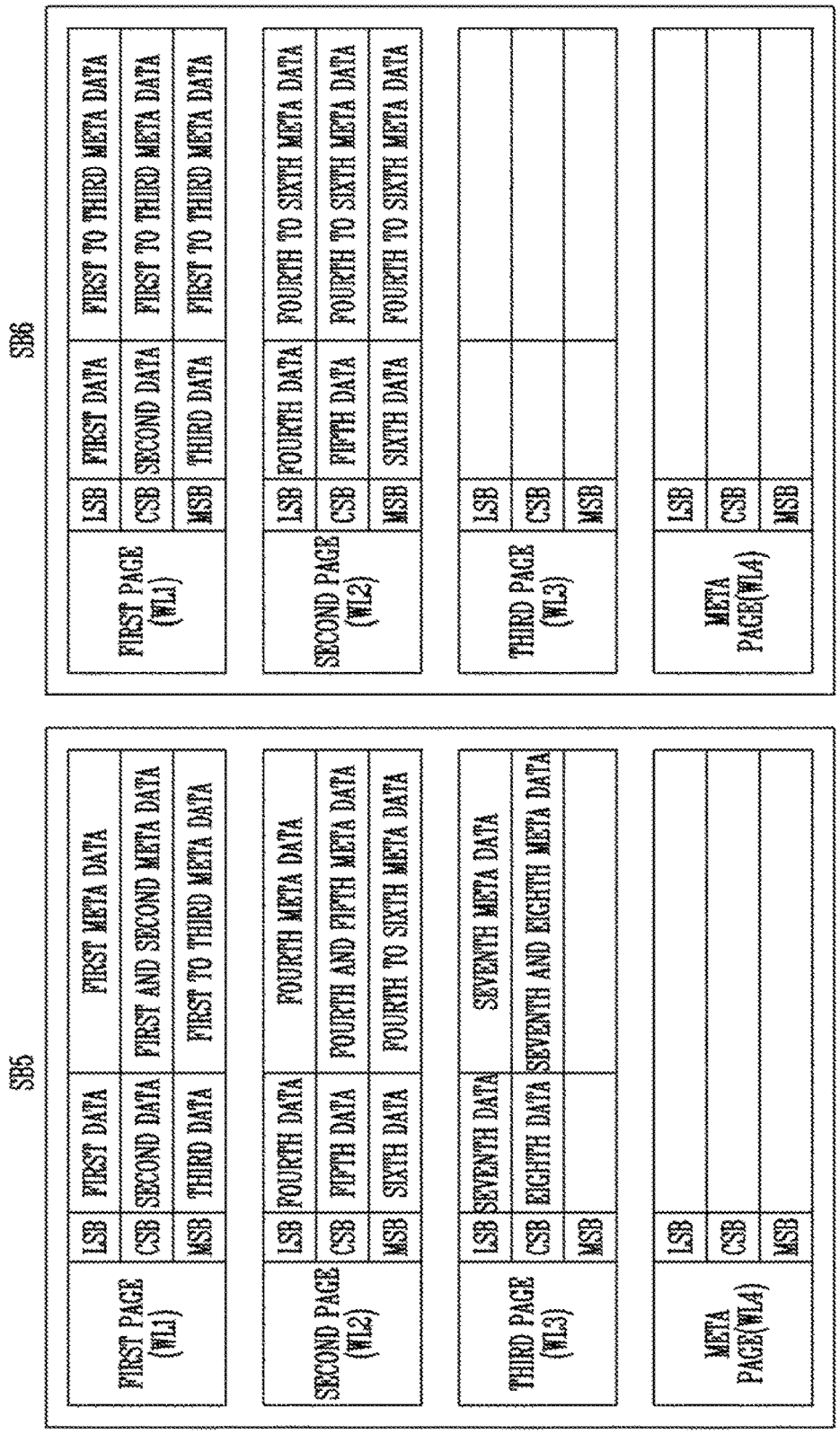
FIG. 10 is a diagram illustrating closed super-blocks including merged metadata, according to another embodiment of the present invention.

FIG. 10 is a diagram illustrating closed super-blocks including merged metadata, according to an embodiment of the present invention.

Referring to FIG. 10, fifth and sixth super-blocks SB5 and SB6 will be described. For convenience of illustration, it is assumed that each of the fifth and sixth super-blocks SB5 and SB6 includes four pages. We note that the number of pages included in one super-block is not limited by FIG. 10. Hereinafter, it is assumed that each of memory cells included in a super-block is a TLC which stores three bits of data. However, the present invention may equally employ MLC or QLC memory cells as described above.

Both the fifth and sixth super-blocks SB5 and SB6 may be open super-blocks. The fifth super-block SB5 is a super-block including merged metadata described with reference to FIG. 8, and the sixth super-block SB6 is a super-block including merged metadata described with reference to FIG. 7.

In the fifth and sixth super blocks SB5 and SB6, three logical page data may be stored in a page corresponding to a plurality of memory cells coupled to a word line. For example, one page may include three logical pages. Here, the three logical pages may be an LSB page, a CSB page, and an MSB page. Each of the logical pages may be divided into a user data area and a metadata area.

The fifth super block SB5 is an open super block according to an embodiment in which the LSB, the CSB, and the MSB pages are sequentially written through a plurality of program operations. Hereinafter, a first page will be described as an example, and it will be understood that a second page is configured in the same manner as the first page.

Referring to the fifth super block SB5, first data of the first page may be LSB data, second data of the first page may be CSB data, and third data of the first page may be MSB data. The logical page data are sequentially programmed, and therefore, metadata of each logical page may be merged metadata obtained by adding previously stored metadata of the logical page in the same page.

For example, only first metadata is stored in the metadata area of the LSB page in the first page, but merged metadata obtained by adding previously stored first and second metadata may be stored in the metadata area of the CSB page in the first page. The second metadata is metadata of the second data that user data to be stored in the CSB page. Merged metadata obtained by adding the previously stored first and second metadata and third metadata may be stored in the metadata area of the MSB page in the first page. The third metadata may be metadata of the third data that is user data to be stored in the MSB page. The merged metadata stored in the metadata area of each logical page may include both L2P mapping data related to logical and physical block addresses of corresponding logical page data and L2P mapping data related to logical and physical block addresses of previously stored logical page data.

A third page of the fifth super-block SB5 is in a state in which only the LSB page and the CSB page are written, and data may be further stored in the MSB page. Since the fifth super-block SB5 is in the open state, a meta page WL4 of the fifth super-block SB5 is not written.

When L2P mapping data is rebuilt due to the occurrence of an SPL, an open super-block cannot rebuild the L2P mapping data by reading the meta page WL4, like the third and fourth super-blocks SB3 and SB4 described with reference to FIG. 9. Therefore, the metadata of all of the logical pages are to be read in the existing super-block SB1 described with reference to FIG. 6.

However, in the case where the fifth super-block SB5 is a super-block in the open state according to the embodiment of the present invention, L2P mapping data can be rebuilt by reading merged metadata stored in the metadata area of the last stored logical page of each page.

For example, L2P mapping data can be rebuilt by reading merged metadata respectively stored in the metadata area of the MSB page of the first page, the metadata area of the MSB page of the second page, and the metadata area of the CSB page of the third page.

The sixth super-block SB6 is an open super-block according to an embodiment in which the LSB page, the CSB page, and the MSB page are simultaneously written through a one-shot program operation. Hereinafter, a first page will be described as an example, and it will be understood that a second page is configured in the same manner as the first page.

Referring to the sixth super-block SB6, logical pages of each page may all be written through a one-shot program operation. For example, the LSB page, the CSB page, and the MSB page of the first page may be written through the one-shot program operation. Therefore, merged metadata obtained by adding metadata of all logical pages included in the same page may be stored in the metadata area of each logical page.

For example, merged metadata obtained by adding first to third metadata may be stored in the metadata area of each of the LSB page, the CSB page, and the MSB page in the first page. The first metadata includes L2P mapping data related to logical and physical block addresses of first data. The second metadata includes L2P mapping data related to logical and physical block addresses of second data. The third metadata includes L2P mapping data related to logical and physical block addresses of third data. Therefore, the L2P mapping data related to the logical and physical block addresses of the first to third data may be stored in the metadata areas of the LSB page, the CSB page, and the MSB page in the first page, respectively.

The sixth super block SB6 is in a state in which only the first and second pages are written and a third page is not written. Since the sixth super-block SB6 is in the open state, a meta page WL4 is not written.

When L2P mapping data is rebuilt due to the occurrence of an SPL, an open super-block cannot rebuild the L2P mapping data by reading the meta page WL4, like the third and fourth super-blocks SB3 and SB4 described with reference to FIG. 9. Therefore, the metadata of all of the logical pages are to be read in the existing super-block SB1 described with reference to FIG. 6.

However, in the case of the sixth super-block SB6 as a super-block in the open state according to the embodiment of the present invention, L2P mapping data can be rebuilt by reading merged metadata stored in the meta page area of an arbitrary logical page among a plurality of logical pages included in each page. For example, L2P mapping data can be rebuilt by reading merged metadata stored in the metadata area of any one page among the LSB page, the CSB page, and the MSB page, included in the first page, and the metadata area of any one page among the LSB page, the CSB page, and the MSB page, included in the second page.

Figure 11:
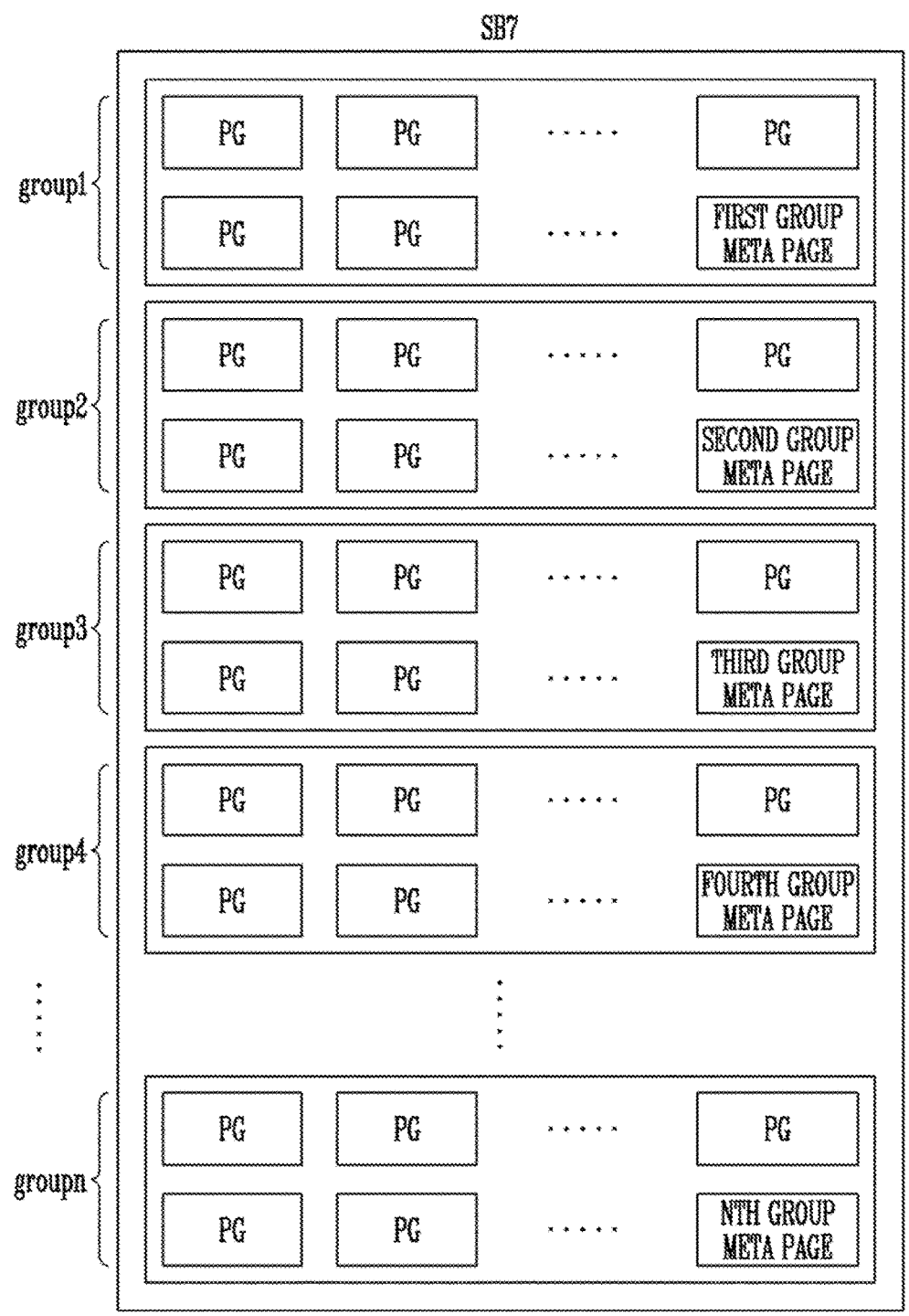
FIG. 11 is a diagram illustrating a group meta page, according to an embodiment of the present invention.

FIG. 11 is a diagram illustrating a group meta page, according to an embodiment of the present invention.

Referring to FIG. 11, a seventh super-block SB7 includes a plurality of pages PG. The number of pages included in one super-block is not limited to the number of pages illustrated in the embodiment of FIG. 11.

In the embodiment of FIG. 11, a plurality of pages PG included in one super-block may be divided into a plurality of groups. For example, the plurality of pages PG included in the seventh super-block SB7 may be divided into first to nth page groups group1 to groupn. Each of the page groups may include a plurality of pages. Each of the page groups may include at least one group meta page. The group meta page may store all metadata stored in pages included in a corresponding page group.

A first group meta page may store group metadata obtained by adding metadata stored in the pages included in the first page group. Second to nth group meta pages may store group metadata obtained by adding metadata stored in the pages included in the second to nth page groups, respectively.

If data are all written in the plurality of pages PG included in one page group, the controller 200 of FIG. 1 may store, in a group meta page, group metadata obtained by adding all metadata included in the corresponding page group.

In an embodiment, the position of a group meta page is not limited by FIG. 11. That is, the group meta page is not included in a corresponding group page but may be included in another page group.

When L2P mapping data is rebuilt due to the occurrence of an SPL, the controller 200 may determine whether group metadata exists in a group meta page. When it is determined that the group metadata exists, L2P mapping data for a corresponding group may be rebuilt by reading the corresponding group meta page. When the group metadata does not exist, the L2P mapping data for the corresponding group may be rebuilt by reading merged metadata according to the method described with reference to FIG. 10.

Figure 12:
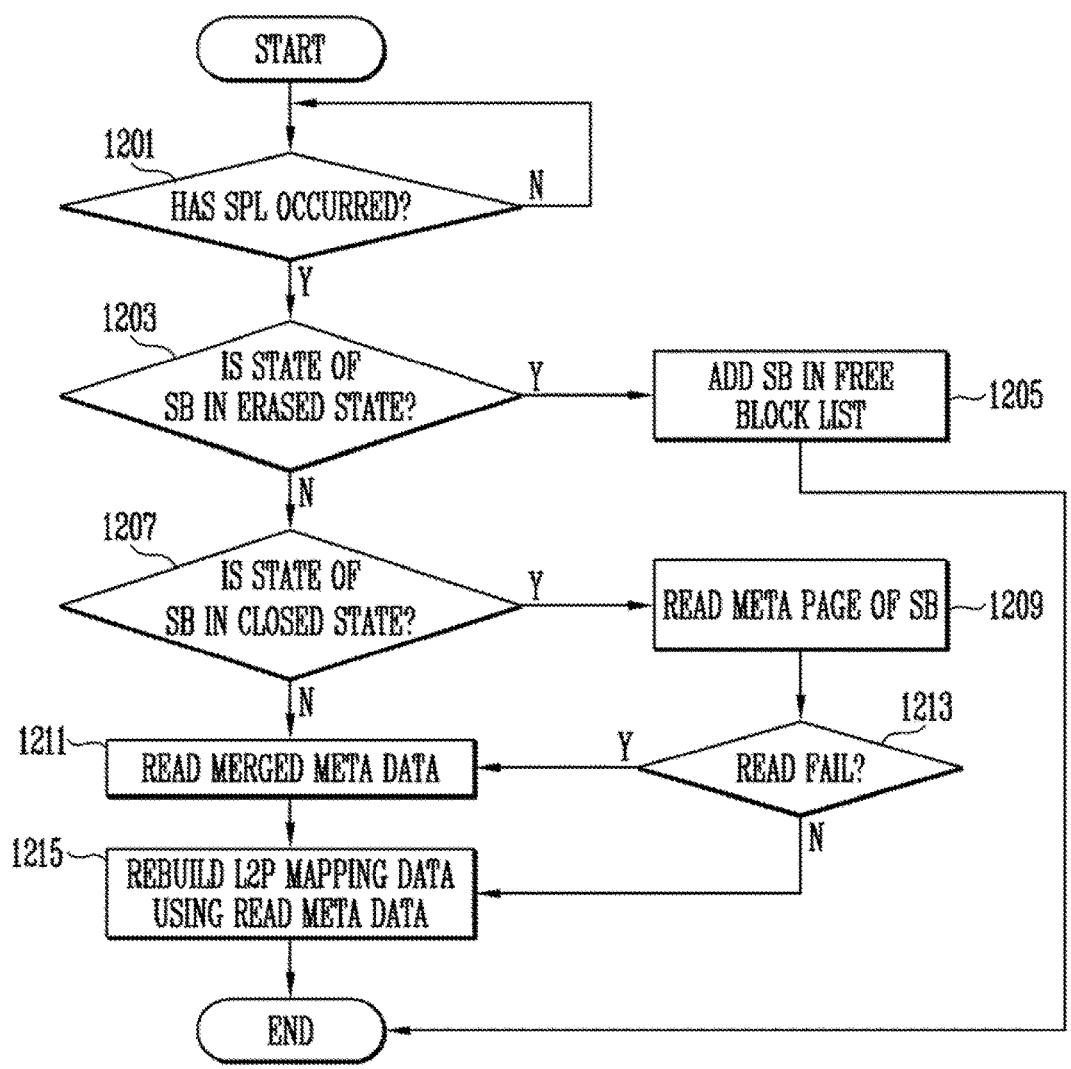
FIG. 12 is a flowchart illustrating an operation of a controller, according to an embodiment of the present invention.

FIG. 12 is a flowchart of an operation of a controller (e.g. 200 in FIG. 1), according to an embodiment of the present invention.

Referring to FIG. 12, in step 1201, the controller may detect the occurrence of an SPL. If the SPL occurs, the controller may rebuild L2P mapping data in units of super-blocks according to the following steps.

In step 1203, the controller may determine whether a super block is in an erased state. If it is determined in step 1203 that the corresponding super-block is in an erased state, in step 1205, the controller adds a corresponding super-block in a free block list and ends the operation. If it is determined in step 1203 that the corresponding super-block is not in an erased state, the controller proceeds to step 1207.

In step 1207, the controller may determine whether the state of the super-block is in a closed state. When the super-block is in a closed state, L2P mapping data may be rebuilt by reading a meta page according to the method described with reference to FIG. 9. If it is determined in step 1207 that the super-block is in a closed state, in step 1209, the controller may read a meta page stored in the super-block and proceed to step 1213. If it is determined in step 1207 that the super-block is not in a closed state, the corresponding super-block will be in an open state, and hence the controller proceeds to step 1211.

In step 1211, the controller reads merged metadata included in the super-block. The merged metadata included in the super-block may be variously stored, according to embodiments described with reference to FIGS. 10 and 11, and therefore, a method of reading merged metadata will be described in detail with reference to FIGS. 13 to 15.

In step 1213, the controller may determine whether the read operation has failed (read fail) as a result obtained by reading the meta page included in the closed super-block. If it is determined in step 1213 that the read operation has failed, the controller proceeds to step 1211, to read merged metadata stored in each page. If it is determined in step 1213 that the read operation has not failed, the controller ends the operation.

In step 1215, the controller may rebuild L2P mapping data using the read metadata and end the operation.

Figure 13:
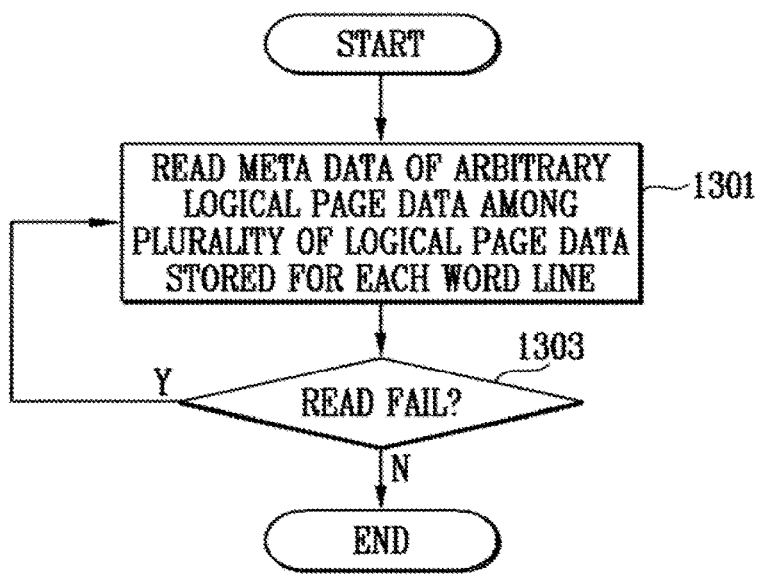
FIG. 13 is a flowchart illustrating a read operation, according to an embodiment of the present invention.

FIG. 13 is a flowchart illustrating a read operation by a controller (e.g. 200 in FIG. 1), according to an embodiment of the present invention.

FIG. 13 illustrates a method of reading merged metadata in the case of the sixth super-block SB6 described with reference to FIG. 10. That is, FIG. 13 illustrates an embodiment of reading merged metadata stored by a program method in which a plurality of logical pages are written through a one-shot program operation.

Referring to FIG. 13, in step 1301, the controller may read metadata of arbitrary logical page data among a plurality of logical page data stored for each word line. For example, a plurality of memory cells coupled to one word line constitute one page. Three logical pages may be included in the one page. The logical pages may all be written through a one-shot program operation. Therefore, merged metadata obtained by adding metadata of all logical pages included in the same page may be stored in the metadata area of each logical page. The controller may read merged metadata stored in the meta page area of an arbitrary logical page among a plurality of logical pages included in each page. For example, the controller may read merged metadata stored in the metadata area of any one page among the LSB page, the CSB page, and the MSB page, included in each page.

In step 1303, if the operation of reading the merged metadata fails (read fall), the controller may proceed to step 1301 to re-read the merged metadata stored in the arbitrary logical page. In this case, the controller may read merged metadata stored in the other logical pages except the logical page in which the read operation previously failed. If it is determined that the read operation succeeds in step 1303, the controller may proceed to step 1215 of FIG. 12 to rebuild L2P mapping data using the read metadata.

Figure 14:
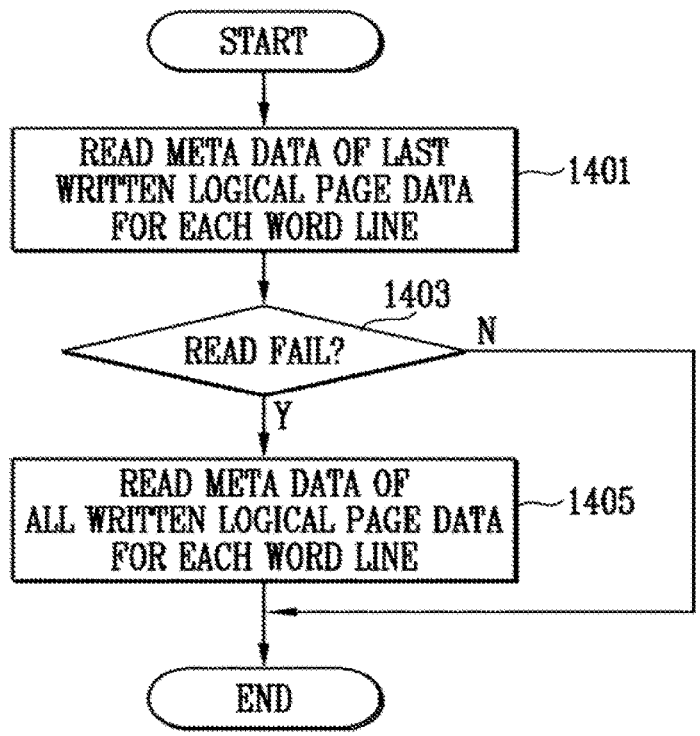
FIG. 14 is a flowchart illustrating a read operation, according to another embodiment of the present invention.

FIG. 14 is a flowchart illustrating a read operation by a controller (e.g. 200 in FIG. 1), according to another embodiment of the present invention.

FIG. 14 illustrates a method of reading merged metadata in the case of the fifth super-block SB5 described with reference to FIG. 10. That is, FIG. 14 illustrates an embodiment of reading merged metadata stored by a program method in which a plurality of logical pages are sequentially written through a plurality of program operations.

Referring to FIG. 14, in step 1401, the controller may read metadata of last written logical page data for each word line. Since logical page data are sequentially programmed, metadata of each logical page may be merged metadata obtained by adding previously stored metadata of the logical page in the same page. Therefore, the controller may read merged metadata stored in the metadata area of the last programmed logical page.

In step 1403, the controller may determine whether the read operation has failed (read fail). If it is determined that the read operation succeeds, the controller may proceed to step 1215 of FIG. 12 to rebuild L2P mapping data using the read metadata.

If it is determined in step 1403 that the read operation has failed, in step 1405, the controller may read metadata of all written logical pages for each word line.

Figure 15:
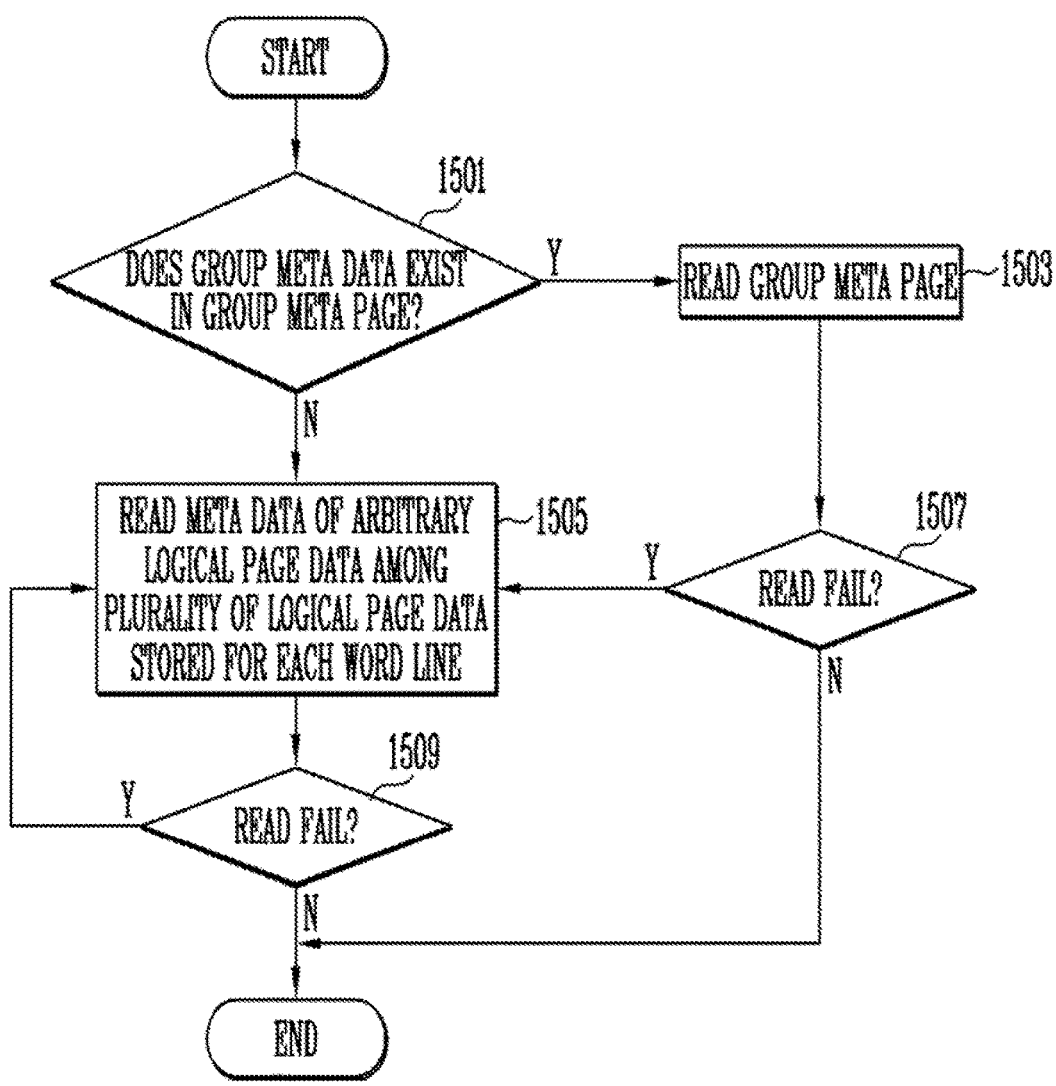
FIG. 15 is a flowchart illustrating a read operation, according to still another embodiment of the present invention.

FIG. 15 is a flowchart illustrating a read operation by a controller (e.g., 200 in FIG. 1), according to still another embodiment of the present invention.

FIG. 15 illustrates a method of reading merged metadata in the case of the seventh super-block SB7 described with reference to FIG. 11. That is, FIG. 15 illustrates a method of reading merged metadata when group metadata is written in a group meta page of a super-block.

Referring to FIG. 15, in step 1501, the controller may determine whether group metadata exists in a group meta page of a super-block. When the group metadata is written in the group meta page, L2P mapping data may be rebuilt by reading only the group meta page. If it is determined in step 1501 that the group metadata is written in the group meta page, the controller proceeds to step 1503 to read the group meta page.

If it is determined in step 1501 that the group metadata does not exist in the group meta page or if the operation of reading the group meta page fails (read fail) in step 1507, the controller proceeds to step 1505.

In step 1505, the controller may read metadata of arbitrary logical page data among a plurality of logical page data stored for each word line. Merged metadata obtained by adding metadata of all logical pages included in the same page may be stored in the metadata area of each logical page. The controller may read merged metadata stored in the meta page area of an arbitrary logical page among a plurality of logical pages included in each page. For example, the controller may read merged metadata stored in the metadata area of any one page among the LSB page, the CSB page, and the MSB page, included in each page.

In step 1509, if the operation of reading the merged metadata fails (read fail), the controller may proceed to step 1505 to again read the merged metadata stored in the arbitrary logical page. In this case, the controller may read merged metadata stored in the other logical pages except the logical page in which the read operation previously failed. If it is determined that the read operation succeeds in step 1509, the controller may proceed to step 1215 of FIG. 12 to rebuild L2P mapping data using the read metadata.

Although not shown in this figure, in an embodiment, when a plurality of logical pages are sequentially written through a plurality of program operations according to a program method of the SMD, steps 1401 to 1405 described with reference to FIG. 14 may be applied instead of steps 1505 to 1509.

Figure 16:
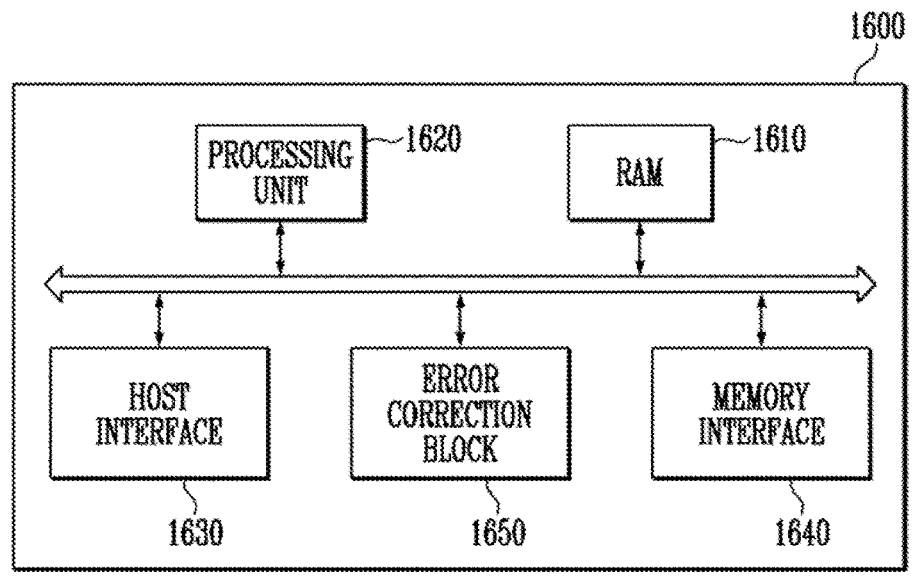
FIG. 16 is a block diagram illustrating a controller, according to an embodiment of the present invention.

FIG. 16 is a block diagram Illustrating an example of a controller 1600 corresponding to the controller 200 of FIG. 1.

Referring to FIG. 16, the controller 1600 may include a random access memory (RAM) 1610, a processing unit 1620, a host interface 1630, a memory interface 1640, and an error correction block 1650.

The processing unit 1620 controls the general operations of the controller 1600. The RAM 1610 may be used as at least one of an operation memory of the processing unit 1620, a cache memory between the SMD and the host, and a buffer memory between the SMD and the host. The processing unit 1620 may execute firmware, thereby performing functions of the memory controller 240 described with reference with FIG. 3.

The host interface 1630 includes a protocol for exchanging data between the host and the controller 1600. In an embodiment, the controller 1600 is configured to communicate with the host through at least one of various interface protocols, such as, for example, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, and a private protocol.

The memory interface 1640 interfaces with the SMD. Any suitable memory interface may be employed.

The 1650 may decode data received from the SMD by using an error correction code. Any suitable error correction code may be employed.

Figure 17:
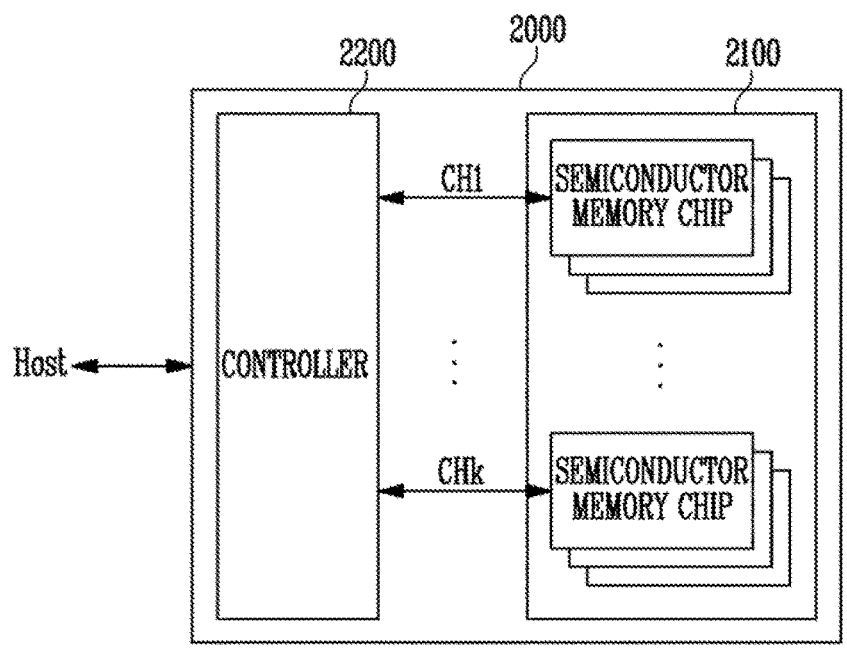
FIG. 17 is a block diagram illustrating an application example of the memory system of FIG. 1, according to an embodiment of the present invention.

FIG. 17 is a block diagram illustrating an application example of a memory system 2000 corresponding to the memory system 50 of FIG. 1.

Referring to FIG. 17, the memory system 2000 includes an SMD 2100 and a controller 2200. The SMD 2100 may include a plurality of semiconductor memory chips. The plurality of semiconductor memory chips are divided into a plurality of groups.

In FIG. 17, it is illustrated that the plurality of groups communicate with the controller 2200 through first to kth channels CH1 to CHk. Each semiconductor memory chip may be configured and operated like the SMD 100 described with reference to FIG. 1.

Each group is configured to communicate with the controller 2200 through one common channel. The controller 2200 is configured identically to the controller 100 described with reference to FIG. 1. The controller 2200 is configured to control the plurality of memory chips of the SMD 2100 through the plurality of channels CH1 to CHk. In FIG. 17, it is illustrated that a plurality of semiconductor memory chips are coupled to one channel. However, it will be understood that the memory system 2000 may be modified such that one semiconductor memory chip is coupled to one channel.

The controller 2200 and the SMD 2100 may be integrated into a single semiconductor device. As an exemplary embodiment, the controller 2200 and the SMD 2100 may be integrated into a single semiconductor device, to constitute a memory card, such as, for example, a PC card (personal computer memory card international association (PCM-CIA)), a compact flash (CF) card, a smart media card (SM or SMC), a memory stick, a multimedia card (MMC, RS-MMC or MMCmicro), an SD card (SD, miniSD, microSD or SDHC), or a universal flash storage (UFS).

The controller 2200 and the SMD 2100 may be integrated into a single semiconductor device to constitute a semiconductor drive, e.g., a solid state drive (SSD). The semiconductor SSD may include a storage device configured to store data in a semiconductor memory. If the memory system 2000 is used as the semiconductor SSD, the operating speed of the host coupled to the memory system 2000 can be remarkably improved.

As another example, the memory system 2000 may be provided as one of various components of an electronic device such as a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

As an exemplary embodiment, the SMD 2100 or the memory system 2000 may be packaged in various forms. For example, the SMD 2100 or the memory system 2000 may be packaged as, package on package (POP), ball grid arrays (BGAs), chip scale packages (CSPs), plastic leaded chip carrier (PLCC), plastic dual in-line package (PDIP), die in Waffle pack, die in wafer form, chip on board (COB), ceramic dual in-line package (CERDIP), plastic metric quad flat pack (MQFP), thin quad flat pack (TQFP), small outline integrated circuit (SOIC), shrink small out line package (SSOP), thin small outline package (TSOP), thin quad flat pack (TQFP), system in package (SIP), multi-chip package (MCP), wafer-level fabricated package (WFP), or wafer-level processed stack package (WSP).

Figure 18:
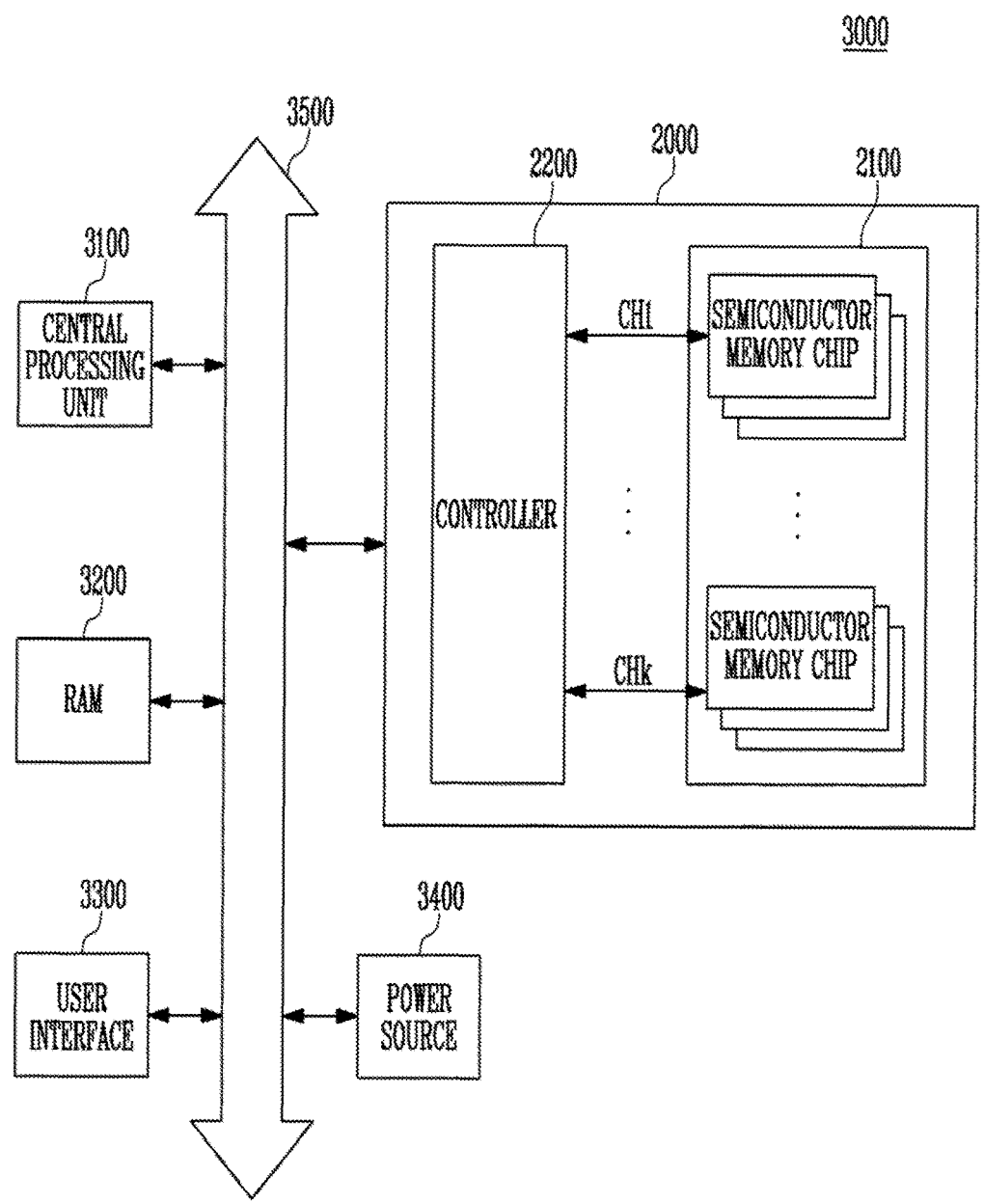
FIG. 18 is a block diagram illustrating a computing system including the memory system of FIG. 17, according to an embodiment of the present invention.

FIG. 18 is a block diagram illustrating a computing system 3000 including the memory system 2000 described with reference to FIG. 17.

Referring to FIG. 18, the computing system 3000 may include a central processing unit 3100, a random access memory (RAM) 3200, a user interface 3300, a power source 3400, a system bus 3500, and a memory system 2000.

The memory system 2000 is coupled electrically to the central processing unit 3100, the RAM 3200, the user interface 3300, and the power source 3400 through the system bus 3500. Data supplied through user interface 3300 or data processed by the central processing unit 3100 are stored in the memory system 2000.

In FIG. 18, it is illustrated that the SMD 2100 is coupled to the system bus 3500 through the controller 2200. However, the SMD 2100 may be directly coupled to the system bus 3500. In this case, the function of the controller 2200 may be performed by the central processing unit 3100 and the RAM 3200.

In FIG. 18, it is illustrated that the memory system 2000 described with reference to FIG. 17 is provided. However, the memory system 2000 may be replaced by the memory system 50 described with reference to FIG. 1. As an exemplary embodiment, the computing system 3000 may be configured to include both the memory systems 50 and 2000 described with reference to FIGS. 1 and 17.

According to the present invention, it is possible to provide a memory system having improved operation speed and an operating method thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present invention as set forth in the following claims.

What is claimed is:

1. A method of operating a controller for controlling a memory block including a plurality of pages, the method comprising:
    determining whether the memory block is in an open state or a closed state;
    if the memory block is in the open state, reading merged metadata included in the plurality of pages; and
    rebuilding logical to physical (L2P) mapping data of a plurality of logical pages included in each of the plurality of pages based on the merged metadata,
    wherein each of the plurality of logical pages includes a userdata area and a metadata area,
    wherein the merged metadata is stored in metadata areas of the plurality of logical pages, and
    wherein the merged metadata represents metadata corresponding to the plurality of logical pages.

2. The method of claim 1, further comprising, if the memory block is in the closed state, reading at least one meta page included in the memory block,
    wherein the at least one meta page includes the merged metadata of the plurality of pages.

3. The method of claim 1, wherein the reading of the merged metadata comprises:
    reading merged metadata stored in a metadata area of an arbitrary logical page among the plurality of logical pages included in each of the plurality of pages; and
    if a read operation of the merged metadata fails, reading merged metadata stored in a metadata area of at least one logical page except the arbitrary logical page in which the read operation has failed among the plurality of logical pages.

4. The method of claim 1, wherein the reading of the merged metadata comprises reading merged metadata stored in a metadata area of a last stored logical page among the plurality of logical pages included in each of the plurality of pages.

5. The method of claim 1, wherein the reading of the merged metadata comprises:
    determining whether group metadata exists; and
    if the group metadata exists, reading a group meta page that stores the group metadata therein,
    wherein the group metadata includes the merged metadata.

6. The method of claim 5, further comprising;
    if the group metadata does not exist, reading merged metadata stored in a metadata area of an arbitrary logical page among the plurality of logical pages included in each of the plurality of pages; and
    if a read operation of the merged metadata fails, reading merged metadata stored in a metadata area of at least one logical page except the arbitrary logical page in which the read operation has failed among the plurality of logical pages.

7. The method of claim 5, further comprising, if the group metadata does not exist, reading merged metadata stored in a metadata area of a last stored logical page among the plurality of logical pages included in each of the plurality of pages included in the memory block.

8. The method of claim 1, wherein the merged metadata includes L2P mapping data related to logical and physical block addresses of the plurality of logical pages included in each of the plurality of pages.

9. The method of claim 1, wherein the plurality of logical pages included in each of the plurality of pages includes logical pages that respectively store least significant bit (LSB) page data, center significant bit (CSB) page data, and most significant bit (MSB) page data therein.

10. A controller for controlling a memory block including a plurality of pages, the controller comprising:
    a processor configured to determine whether the memory block is in an open state or a closed state, and, if the memory block is in the open state, reading merged metadata included in the plurality of pages; and
    a memory controller configured to rebuild logical to physical (L2P) mapping data of a plurality of logical pages included in each of the plurality of pages based on the merged metadata,
    wherein each of the plurality of logical pages includes a userdata area and a metadata area,
    wherein the merged metadata is stored in metadata areas of the plurality of logical pages, and
    wherein the merged metadata represents metadata corresponding to the plurality of logical pages.

11. The controller of claim 10, wherein, if the memory block is in the closed state, the processor reads at least one meta page included in the memory block, and
    the at the least one meta page includes the merged metadata of the plurality of pages.

12. The controller of claim 10,
    wherein the processor reads merged metadata stored in a metadata area of an arbitrary logical page among the plurality of logical pages included in each of the plurality of pages included in the memory block, and, if a read operation of the merged metadata fails, reads merged metadata stored in a metadata area of at least one logical page except the arbitrary logical page in which the read operation has failed among the plurality of logical pages.

13. The controller of claim 10,
    wherein the processor reads merged metadata stored in a metadata area of a last stored logical page among the plurality of logical pages included in each of the plurality of pages.

14. The controller of claim 10,
    wherein the processor determines whether group metadata obtained by adding metadata of some pages among the plurality of pages exists, and, if the group metadata exists, reads a group meta page that stores the group metadata therein, and
    the group metadata includes merged metadata.

15. The controller of claim 14,
    wherein, if the group metadata does not exist, the processor reads merged metadata stored in a metadata area of an arbitrary logical page among the plurality of logical pages included in each of the plurality of pages, and, if a read operation of the merged metadata fails, reads merged metadata stored in a metadata area of at least one logical page except the arbitrary logical page in which the read operation has failed among the plurality of logical pages.

16. The controller of claim 14,
wherein, if the group metadata does not exist, the processor reads merged metadata stored in a metadata area of a last stored logical page among the plurality of logical pages included in each of the plurality of pages.

17. The controller of claim 10,
wherein the merged metadata includes L2P mapping data related to logical and physical block addresses of the plurality of logical pages included in each of the plurality of pages.

18. The controller of claim 10,
wherein the plurality of logical pages included in each of the plurality of pages include logical pages that respectively store least significant bit (LSB) page data, center significant bit (CSB) page data, and most significant bit (MSB) page data therein.

19. A memory system comprising:
a memory device including a memory block including a plurality of pages, configured to store merged metadata by adding metadata of a plurality of logical page data to be stored in a selected page among the plurality of pages in metadata areas of a plurality of logical pages included in the selected page; and
a controller configured to rebuild logical to physical (L2P) mapping data based on the merged metadata,
wherein the controller is further configured to read merged metadata stored in a metadata area of an arbitrary logical page among the plurality of logical pages included in selected page the, and
if a read operation of the merged metadata stored in the metadata area of the arbitrary logical page fails, to read merged metadata stored in a metadata area of at least one logical page except the arbitrary logical page in which the read operation has failed among the plurality of logical pages.

20. The memory system of claim 19,
wherein the controller is configured to determine whether the memory block is in an open state or a closed state;
if the memory block is in the open state, to read merged metadata included in the memory block; and
if the memory block is in the closed state, to read at least one meta page included in the memory block, the at the least one meta page including the merged metadata included in the memory block.

\* \* \* \* \*